INVENTOR.
JIRI HRDINA

BY

Attorney

United States Patent Office 3,512,398
Patented May 19, 1970

3,512,398
METHOD FOR MEASURING THE EXTINCTION OF A CONTINUOUS OR DISCONTINUOUS FLOW OF A LIQUID
Jiri Hrdina, Prague, Czechoslovakia, assignor to Ceskoslovenska Akademie Ved, Prague, Czechoslovakia, a corporation of Czechoslovakia
Continuation of application Ser. No. 476,793, Aug. 3, 1965. This application May 9, 1968, Ser. No. 728,084
Claims priority, application Czechoslovakia, Aug. 11, 1964, 4,543/64
Int. Cl. G01n 21/00
U.S. Cl. 73—61.1
12 Claims

ABSTRACT OF THE DISCLOSURE

The photometric measurement of liquid samples introduced by a first inlet into a substantially upstanding flowcell having at its stop a second inlet for supplying gas thereinto and an outlet at its bottom connected to an automatically operated suction device drawing the measured contents of the flowcell after each measurement and recording.

Figure 1:
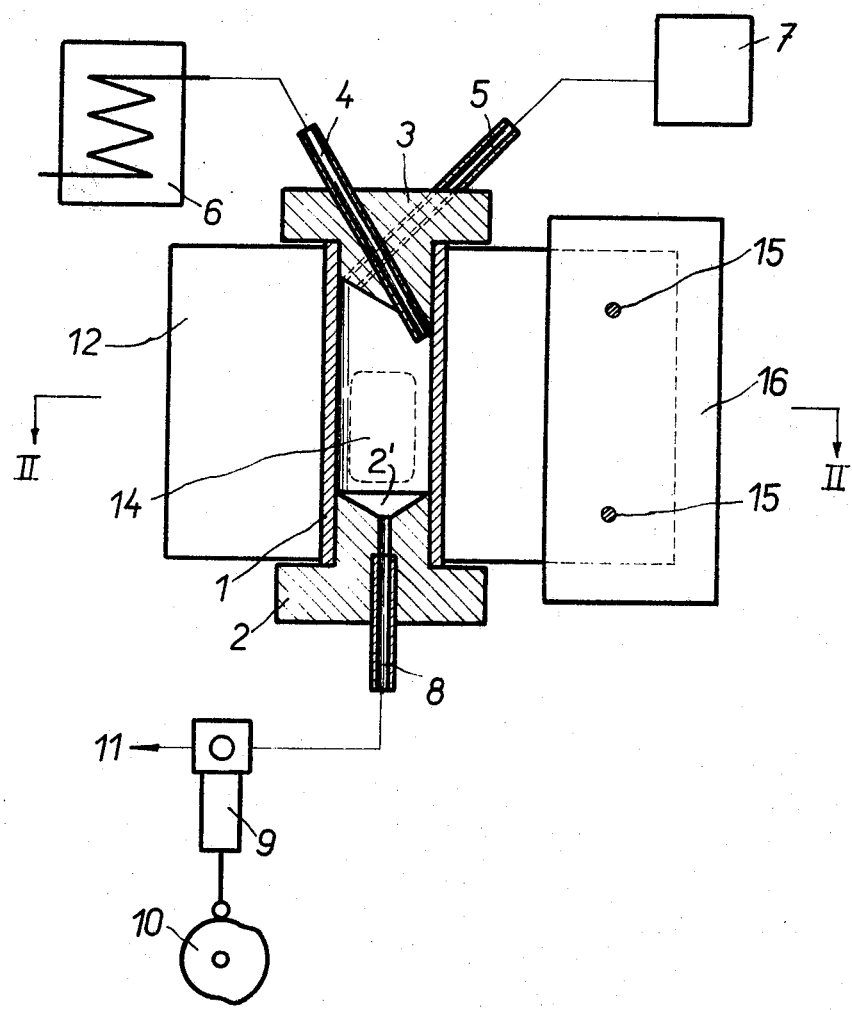

This application is a continuation of application No. 476,793, filed Aug. 3, 1965, now abandoned.

The present invention relates to a method of and apparatus for, effecting photometric measurements of liquids. The invention is particularly, but not solely, concerned with the measurement of absorption of liquids.

There is a requirement for periodical photometric measurement of a liquid sample which carries a coloring matter for example, created by the color-making reaction in a capillary reactor. The measurement is to be effected with great accuracy and steps must be taken to ensure that the separate zones of the liquid containing colored solution in different concentrations and constiuting samples are not mixed and are conveyed successively to the photometer. This undesirable mixing occurs considerably in the flowcell of conventional design through which the liquid normally flows in a laminar manner, i.e. the liquid flow velocity is substantially greater near the axis of the flowcell than that near the flowcell walls. This phenomenon causes disturbances so that the individual components of the analyzed mixture cannot be distinguished. These components should be indicated by photometry, after previous chromatographic separation, but due to the aforementioned effect the simple law that the absorption of the liquid in the space of the flowcell is homogeneous is no longer true. An example of the application of this measurement is in column chromatography where a colorless solution flows through a conventional flowcell during a fixed time period and is followed by a colored solution. The interface between the samples at the entrace to the photometric flowcell should be sharp enough for measuring purposes since the colored liquid flows through the flowcell space in the shape of a longitudinal paraboloid and the portion of colored liquid in the measuring space of the flowcell passes along the axis of the flowcell and only successively spreads to the walls. The head part of the colorless solution however, penetrates the colored paraboloid in the space near to its axis, thus creating a colorless core surrounded by colored liquid near the walls of the flowcell.

An apparatus is known for carrying out simple analysis wherein samples are separated with the aid of gas bubbles to prevent mixing and the flowcell is emptied periodically by means of a syphon arrangement. The results of the photometric measurement are recorded by a simple pen recorder and appear in the form of a curve. Methods of emptying the flowcell using a syphon are well known, although it is difficult to ensure that the flowcell is completely emptied. The flowcell is filled with liquid from capillary reactors and separated by gas bubbles acting as pistons forced without appreciable accuracy and regularity into the liquid. The emptying and filling operations are carried out with peristaltic pumps which, so far as accuracy is concerned, cannot be compared with precision piston pumps.

For processes where high accuracy in the separating of the liquid into samples is required mixing of a new sample entering the flowcell with parts of the preceding sample not removed from the flowcell is to be prevented. This desired effect can be realized by the present invention where the liquid in the measuring space of the flowcell is always homogeneous.

According to the present invention there is provided a method of effecting a photometric measurement of a liquid comprising the steps of passing samples of a liquid to be investigated photometrically successively into a flowcell, passing a gas into the flowcell at the same time as each liquid sample enters the flowcell, making the photometric measurement of each sample and recording the result, and operating a suction device automatically to suck each sample and the gas from the flowcell so that the flowcell is ready to receive the next succeeding sample.

Further according to the invention there is provided an apparatus for photometric measurement of liquids comprising a flowcell, a first inlet for supplying liquid samples to the flowcell, a second inlet for supplying a gas to the flowcell, an outlet, a suction device connected to the outlet for sucking liquid samples and gas mixtures from the flowcell through said outlet, and means to operate the suction device automatically to suck a liquid sample and gas mixture from the flowcell when the photometric measurement has been made and recorded.

The principle of the invention is that the flowcell is completely emptied immediately after each measurement by means of the suction device which may be a vacuum pump. Since the flowcell is completely emptied as far as possible with no residual liquid on its walls, the undesirable mixing of samples is avoided.

Figure 2:
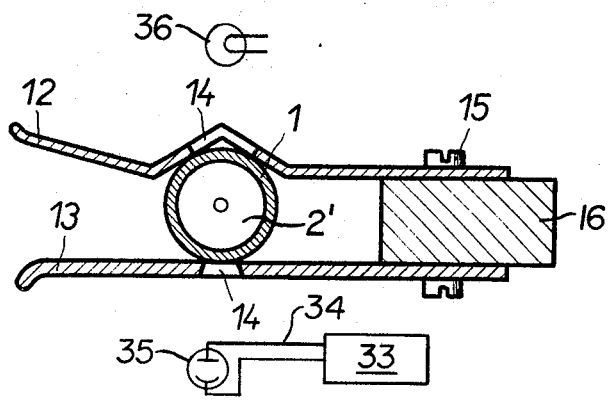
Figure 3:
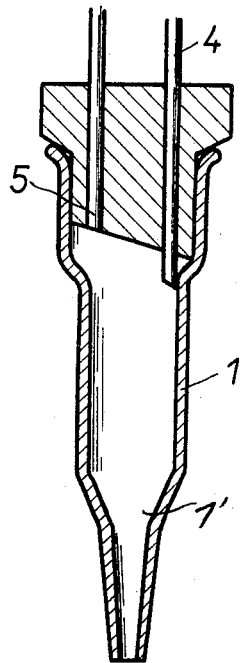
Figure 4:
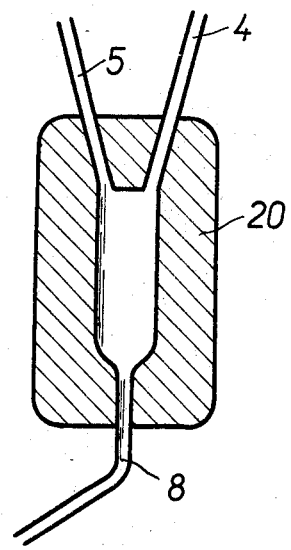
Figure 5:
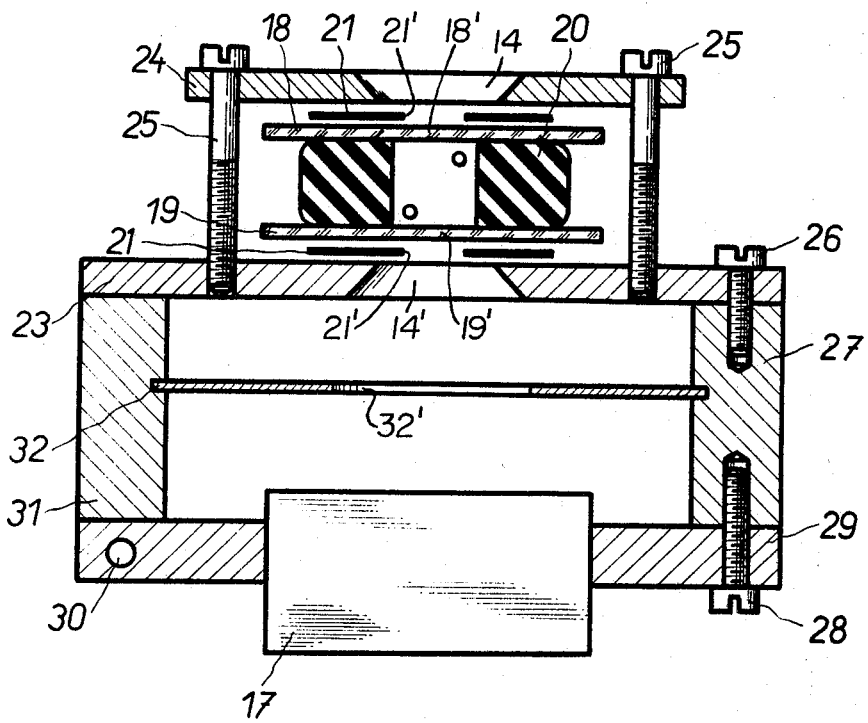

The above said and other objectives and advantages of my invention will be more fully understood from the following specification when read with the accompanying drawing in which FIG. 1 shows the flowcell substantially in an axial sectional view perpendicular to the direction of the optical axis of the used but not illustrated photometer, i.e. to the direction of the photometric light rays;

FIG. 2 is a sectional view along line II—II of FIG. 1;

FIGS. 3 and 4, respectively, show in axial cross section two different embodiments of the flowcell, and FIG. 5 is a cross sectional view of a photometric device including an embodiment of my new flowcell.

All reference numerals in the figures relate to the same or equivalent elements.

As shown in FIGS. 1 and 2 the apparatus has a flowcell in the form of a tube 1 made from a transparent material such as glass or quartz, sealed at its upper end with a plug 3 and at its lower end with a plug 2. The plug 3 has an inner end face which extends obliquely realtive to the axis of the tube 1. Two hollow needles 4 and 5 forming inlets extend through the plug 3 to communicate with the interior of the tube 1. The needles 4 and 5 extend obliquely relative to the axis of the tube. The needle 4 serves to supply liquid samples to the flowcell which are to be investigated photometrically. The liquid may be supplied for example, from a capillary reactor 6. The needle 5 terminates within the tube 1 somewhat higher than the needle 4 and at the highest part of the interior of the tube. The needle 5 serves to supply gas, such as air to the interior of the tube 1 either from a compressed air or other gas source 7 or from the atmosphere. A hollow needle 8 forming an outlet extends to the lowest point 2' of a depression in the top surface of plug 2 to communicate with the interior of the tube 1. The needle 8 is substantially colinear with the axis of the tube. The needle 8 is connected to a suction device in the form of a vacuum pump 9 and is used to draw off liquid and gas mixtures from the tube 1 at predetermined intervals. The liquid and gas mixtures drawn from the tube 1 are conducted to a drain, as indicated schematically at 11 in FIG. 1. As shown more clearly in FIG. 2 the tube 1 is held between two resilient metal shades 12 and 13 which have apertures 14 through which a light beam is passed. The apertures 14 define a measuring space within the flowcell which is shown clearly in FIG. 1 as a rectangle 14. The metal shades 12, 13 are attached by means of screws 15 to a plate 16 and can be adjusted in realtion thereto. As shown in FIG. 2 an operator can observe the flowcell through the gap between the metal shades 12, 13 at the left hand side of the figure. The metal shade 12 is bent outwardly away from the metal shade 13 so as to make observations easier and to facilitate the removal and replacement of the flowcell through the gap. The visual observation of the flowcell is desirable so that its correct operation can be ensured. The filling and emptying of the flowcell can be observed as well as its cleanliness and the correct level of liquid in the flowcell during the photometry measurement can be maintained.

The vacuum pump 9 is preferably of the slide valve type and is operated by a cam 10. The timing of the suction stroke is arranged so as to occur after the photometric measurement has been made and recorded preferably on a pen recorder, the arrangement and connection of which is shown schematically in FIG. 3. The recorder, indicated generally at 33, being preferably of the type that records discrete points, i.e. a point recorder. Light rays emitted by the bulb 36 pass through the aperture 14 in the shade 12, through the fluid present in the measuring space of the tube 1, through the other aperture 14 in the shade 13 and impinge on the photocell 35. The photocell responds in proportion to the intensity of light received and actuates the recorder 33. To synchronize the operation of the pump 9 with the recorder various methods can be adopted. For example, synchronous electric motors could be used and digital techniques can be adopted to correct any deviation from the correct timing.

Another arrangement can be used in place of the vacuum pump 9 to draw off the liquid and gas from the flowcell. The needle 8 is connected at the appropriate time to a chamber in which a low pressure is maintained. The synchronous operation of the apparatus could then be achieved by using electromagnetic valves to open and close flexible tubing and the valves could be actuated by cam mechanisms in the pen recorder. The cam mechanisms in the pen recorder are used in addition to disconnect a measuring and balancing circuit associated with the electric motor driving the recorder during the period when a photometric measurement is not being effected. This is advantageous since normally when the flowcell is empty or being filled the photometric absorption, for instance, fluctuates and the pen recorder performs undesirable movements. If the cam mechanisms are used as mentioned the carriage of the pen recorder will remain at the position where the last measuring operation was performed and as the next measuring operation is performed the carriage will only move by a small amount corresponding to the difference between the last and the present measured values. The resultant curve will thus be more accurate and is easy to interpret.

The operation of the apparatus is as follows:

A liquid sample is passed into the empty flowcell via the needle 4 and a quantity of gas from the source 7 is passed into the flowcell via the needle 5. The liquid sample is then analyzed photometrically and the results recorded. The liquid and gas mixture is then sucked out of the flowcell via the needle 8 so that the flowcell is ready to receive the next sample.

The shape of the tube 1 can be modified to that shown in FIG. 3 where it can be seen that the lower part of the tube 1 is tapered into a capillary tube for connection to the vacuum pump 9 or low pressure chamber by means of a flexible tubing or hose. The needles 4 and 5 are again indicated. The smooth shape of the tube 1 enables the emptying operation to be effected more quickly. It is important in this respect for the flowcell to have a symmetrical shape and a further alternative is shown in FIGS. 4 and 5. A space formed between two parallel plates 18, 19 partly defines the flowcell. The plates 18, 19 are made from a transparent material such as glass or quartz and a resilient body or, gasket 20 made from a resilient material, such as a synthetic plastics material is clamped between the plates. The flowcell is therefore defined by the inwardly facing walls of the plates 18, 19 and the inner walls of the gasket 20. The measuring space of the flowcell is delimited by a pair of shades 21 which can be clamped rigidly against the outer faces of the plates 18, 19 when an upper and a lower mounting plate 24, 23 are urged together by means of screws 25. The plates 23, 24 are provided with central apertures shown to be of frusto-conical shape but which could be of any suitable shape since the apertures are not intended to delimit the measuring space of the flowcell but merely allow light rays to pass therethrough. The lower plate 23 is attached to an arm 27 by means of screws 26 and the arm 27 is attached to a base of the apparatus, not shown in the drawing. The arm 27 is also attached to a support plate 29 by means of screws 28. The support plate 29 has an aperture into which an insert 17 is placed. The insert 17 carries a photometric measuring device such as a photoelectric cell. The insert 17 is clamped in the plate 29 by adjusting a screw 30. The side of the insert 17 facing the flowcell is to be closed to external light and the detachable block 31 ensures this is achieved. The block 31 can easily be removed to set up the apparatus or effect cleaning, etc. A further shade 32 is mounted between the flowcell and the insert 17 and is carried in slots provided in the arm 27 and block 31. The shade 32 is to ensure that light deviating from the light beam passing through the flowcell does not reach the photoelectric cell in the insert 17. This deviated light could be scattered by the rising level of liquid during filling of the flowcell and be reflected by the inner wall of the arm 27 and block 31.

The apparatus made in accordance with the invention ensures the complete emptying, within practical limits, of the flowcell after the photometric measurement has been made and recorded. The suction device ensures removal of the gaseous content of the flowcell and the small residual droplets of liquid clinging to the wall of the flowcell which hitherto have always been a problem.

By arranging the shades in an appropriate manner the measuring space of the flowcell can be situated adjacent the bottom of the flowcell. The photometric measurement can then be carried out until the level of the liquid sample rises above the upper limit of the measuring space, and the remainder of the flowcell is filled with gas.

The technique of urging gas bubbles into a liquid to separate samples which has hitherto proved troublesome no longer introduces inaccuracies into the photometric measurement. These gas bubbles either join the gaseous volume above the liquid sample in the flowcell or float at the interface between the sample and the gas above it. In any event they are removed from the measuring space of the flowcell.

While specific embodiments of my invention have been shown and described in detail to illustrate the application of its principles, it will be understood that it may be differently embodied without departing from such principles.

What I claim as my invention is:

1. The method of effecting a photometric measurement of a liquid sample in a measuring cell which is exposed to photometric light rays, comprising the steps of:
   passing said liquid sample into said measuring cell through a capillary passage during a predetermined time interval, thereby at least partially filling said measuring cell to a predetermined level,
   photometrically measuring said liquid sample within a fixed zone below said predetermined level, recording the results of said measuring step while said liquid sample remains at a level above said predetermined level, and subsequently applying a reduced pressure to an outlet tube communicating with said measuring cell while maintaining substantially constant pressure in said cell, whereby measurements of said liquid sample are made while said sample remains at rest in said cell.

2. The method according to claim 1 wherein said liquid sample flowing into said cell is separated into segments by gas bubbles, whereby gas from said bubbles is collected above the level of said liquid sample in said cell and does not interfere with said photometric measurements.

3. The method according to claim 2 including supplying gas through a separate inlet to said measuring cell for maintaining said constant pressure.

4. The method according to claim 1 including synchronizing said reduced pressure applying step with the measuring and recording steps.

5. An apparatus for photometric measurement comprising a substantially upstanding measuring cell, a first inlet for supplying liquid samples thereinto, a second inlet in the top of the measuring cell for supplying gaseous medium thereinto, an outlet at the bottom of the measuring cell, a suction device connected to said outlet for sucking liquid samples and any gaseous medium from the measuring cell, and automatically operating means for the suction device to completely suck the measured liquid sample and any gaseous medium from the measuring cell after each measurement and recording.

6. An apparatus according to claim 5 comprising a source of compressed gas connected to the second inlet.

7. An apparatus according to claim 6 wherein the first inlet extends within the flowcell by a greater distance than does the second inlet so as to allow the liquid sample to flow down the inner wall thereof.

8. An apparatus according to claim 5 comprising a pair of metal shades resiliently holding the flowcell and light rays permeable openings in said shades defining the measuring space as close as possible above the bottom of the flowcell.

9. An apparatus according to claim 5 comprising a funnel shaped lower end of the flowcell forming said outlet.

10. An apparatus according to claim 5 comprising two parallel transparent plates and means resiliently spacing said plates apart, said plates and said spacing means forming a measuring cell.

11. An apparatus according to claim 10 comprising two shades adjacent each of the parallel plates and apertures in said shades letting light rays pass through the measuring space of the flowcell.

12. An apparatus according to claim 10 comprising a screen member between the flowcell and the recording means to avoid secondary reflected light rays.

References Cited

UNITED STATES PATENTS

| | | |
|---|---|---|
| 2,797,149 | 6/1957 | Skeggs. |
| 2,879,141 | 3/1959 | Skeggs. |
| 2,899,280 | 8/1959 | Whitehead et al. |
| 2,982,123 | 5/1961 | Kindred. |
| 3,166,929 | 1/1965 | Pelavin. |
| 3,225,645 | 12/1965 | Baruch et al. |
| 3,230,048 | 1/1966 | Skeggs _____ 73—61.1 X |
| 3,307,447 | 3/1967 | Carleton et al. |
| 3,391,598 | 7/1968 | De Grave et al. _____ 88—14 |

LOUIS R. PRINCE, Primary Examiner

J. W. ROSKOS, Assistant Examiner

U.S. Cl. X.R.

356—246